United States Patent
Lee

(10) Patent No.: US 6,360,147 B1
(45) Date of Patent: Mar. 19, 2002

(54) METHOD FOR MINIMIZING ERRORS IN SENSORS USED FOR A RECORDING APPARATUS OF CAR ACCIDENTS

(75) Inventor: Won-Hee Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/692,977

(22) Filed: Oct. 20, 2000

(30) Foreign Application Priority Data

Dec. 24, 1999 (KR) ............................................. 99-62081

(51) Int. Cl.[7] .............................. G06F 7/00; G06F 19/00
(52) U.S. Cl. .............................. 701/35; 701/34; 701/38; 360/5
(58) Field of Search .......................... 701/35, 200, 38, 701/39, 34; 360/5

(56) References Cited

U.S. PATENT DOCUMENTS

| | | | |
|---|---|---|---|
| 4,882,693 A | * 11/1989 | Yopp | 364/424.01 |
| 5,311,431 A | * 5/1994 | Cao et al. | 364/424.05 |
| 5,557,520 A | * 9/1996 | Suissa et al. | 364/424.01 |
| 5,742,919 A | * 4/1998 | Ashrafi et al. | 701/70 |

* cited by examiner

Primary Examiner—Yonel Beaulieu
(74) Attorney, Agent, or Firm—Christie, Parker & Hale, LLP

(57) ABSTRACT

In a method for minimizing errors in sensors used for a recording apparatus of car accidents, data including acceleration, yaw-rate, vehicle speed measured at the transmission, and steering angle are first measured by sensors, then error in forward acceleration is corrected on the basis of vehicle speed measured at the transmission. Next, error in lateral acceleration is corrected on the basis of vehicle speed and steering angle measured by a steering angle sensor, then error in rotational angular velocity is corrected on the basis of steering angle and vehicle speed. Finally, data is recorded as corrected values.

7 Claims, 2 Drawing Sheets

METHOD FOR MINIMIZING ERRORS IN SENSORS USED FOR A RECORDING APPARATUS OF CAR ACCIDENTS

BACKGROUND OF THE INVENTION (a) Field of the Invention

The present invention relates to a method for minimizing errors in sensors used for a recording apparatus of car accidents, and more particularly, to a method to enable precise recordation of car accidents by minimizing errors in sensors.

(b) Description of the Related Art

A recording apparatus of a car accident is provided to enable scientific research of the cause and the process of the car accident.

The apparatus may use sensors to detect the beginning of a collision of a car or it may distinguish the accident from a switch operation of the driver or from a signal of airbag operation.

During a period of time around the instant of the accident, the apparatus records the road conditions where the accident occurred, as well as the driver's operation of equipment, the motion of the car, and other movement circumstances.

Accordingly, the recording apparatus needs to be designed to protect data from heat and submergence in such situations as when the car catches fire during a collision or when it is submerged in water.

And the recording apparatus, being mounted on a car driven on the road, needs to be designed so that sensor error due to road conditions and driving circumstances is as small as possible. Of the sensors used for the recording apparatus, data from the acceleration sensor and rotational angular velocity sensor have an important role in reconstructing the accident. A rotational angular velocity sensor is also known as a yaw-rate sensor. But the two sensors exhibit a zero offset drift phenomena, the phenomena being that the zero point of the sensors drifts.

FIG. 1 is a diagram showing a relationship between zero offset errors and the total error caused by zero offset errors.

When the acceleration sensor shows zero G, G meaning the unit of gravitation, or when the yaw-rate sensor shows zero deg/sec, the output of the sensor is said to have/show zero offset or zero output, or it is said to be zero biased. But the datum point when the sensor shows zero offset changes because of environmental factors such as temperature which cause sensor error, the aforementioned zero offset drift error or zero bias drift error.

The zero offset error accumulates when integration is taken, so that the sum of errors becomes fatal in most cases, especially for reconstructing the trajectory of a car, because a second order integration is needed to reconstruct the trajectory. That is, a very small zero offset error may cause a fatal error in calculation of position on the trajectory.

Many methods to correct the zero offset error are devised such as a method using a high frequency tube and filter, and a method using a heat insulating means. But those methods can not perfectly remove errors caused by the zero offset drift phenomena. Accordingly, a proper correction has to be made in the stage of accident analysis, and the correction has to be made manually in the process of using a computer program for accident reconstruction.

SUMMARY OF THE INVENTION

The present invention has been made in an effort to solve the above problem of the prior art.

It is an objective of this invention to provide a method for minimizing errors in sensors used for a recording apparatus of car accidents, automatically correcting the data measured by an acceleration sensor and a yaw-rate sensor on the basis of the vehicle speed measured at the transmission and of the steering angle measured by a steering angle sensor.

In a method for minimizing errors in sensors used for a recording apparatus of car accidents, data including acceleration, yaw-rate, vehicle speed measured at the transmission, and steering angle are first measured by sensors, then error in forward acceleration is corrected on the basis of vehicle speed measured at the transmission. Next, error in lateral acceleration is corrected on the basis of vehicle speed and steering angle measured by a steering angle sensor, then error in rotational angular velocity is corrected on the basis of steering angle and vehicle speed. Finally, data is recorded as corrected values.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be hereinafter described with reference to the accompanying drawings.

Figure 1:
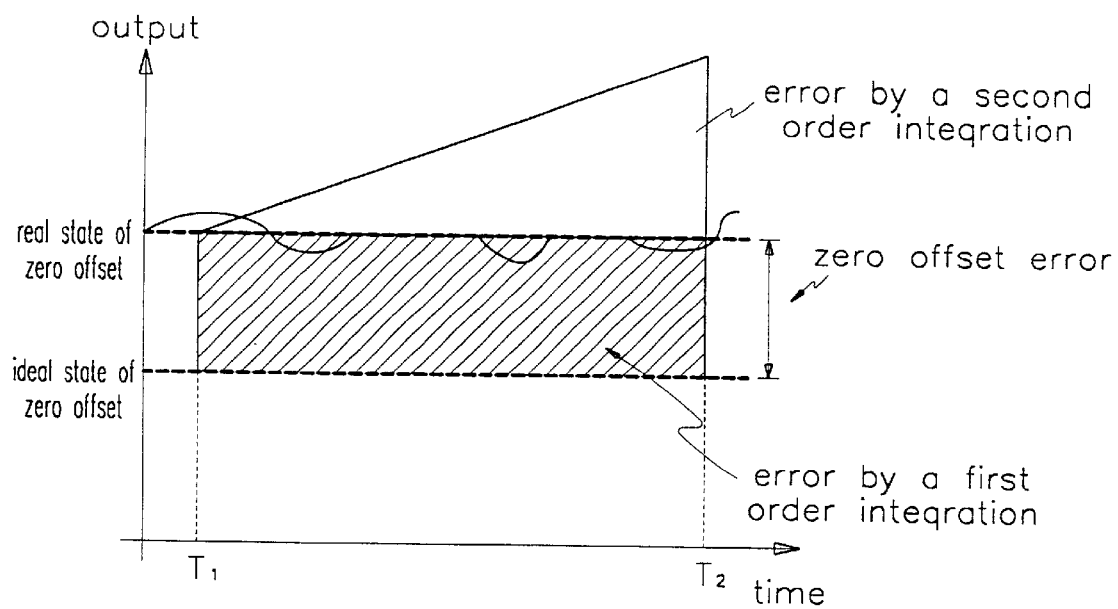
FIG. 1 is a diagram of zero offset errors showing the enlargement of error as integrations are taken, according to the prior art.
Figure 2:
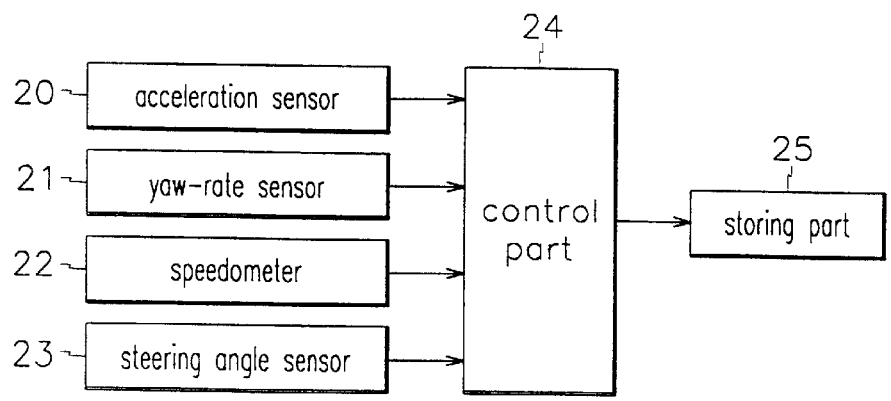
FIG. 2 is a block diagram of a recording apparatus according to a preferred embodiment of the present invention.

FIG. 2 is a block diagram of a recording apparatus of a car accident according to a preferred embodiment of the present invention, comprising:

at least one acceleration sensor 20 to measure acceleration;

at least one yaw-rate sensor 21 to measure a rotational angular velocity;

at least one speedometer 22 mounted at the transmission to measure the vehicle speed;

at least one steering angle sensor 23 to measure steering angle;

a control part 24 to calculate and correct zero offset errors of the acceleration sensor and the yaw-rate sensor on the basis of the vehicle speed measured by the speedometer and the steering angle measured by the steering angle sensor;

and a storing part 25 to store the output values of the control part.

Figure 3:
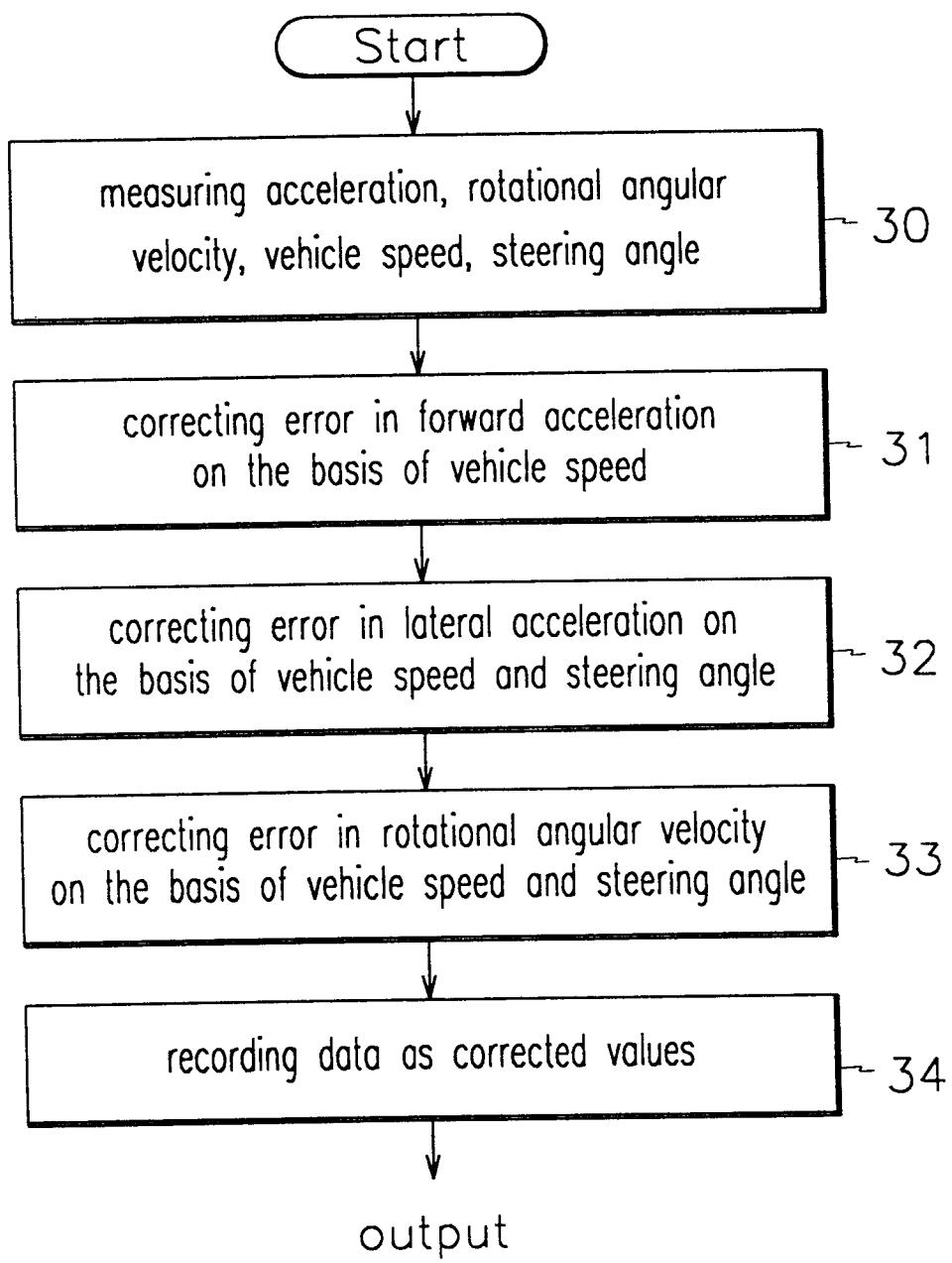
FIG. 3 is a flowchart showing a method for minimizing error in sensors used for a recording apparatus of a car accident, according to a preferred embodiment of the present invention.

FIG. 3 is a flowchart showing a method for minimizing errors in sensors used for a recording apparatus of car accidents, according to a preferred embodiment of the present invention.

In a first step 30, when a car is being driven, data are measured by sensors 21~23 and stored in the storing part 25, the data including acceleration, rotational angular velocity, vehicle speed, and steering angle.

The data of acceleration and rotational angular velocity measured in the first step need to be corrected because the acceleration sensor 30 and the rotational angular velocity sensor 21 tend to exhibit a zero offset drift phenomena.

An acceleration is specified as the sum of a forward acceleration and a lateral acceleration.

A second step 31 corrects the error in forward acceleration, and a way to correct the error in forward acceleration will be hereinafter described.

There is a relationship between the forward acceleration $G_x$ measured at the acceleration sensor and the forward vehicle speed $V_x$, such as, $$G_x = (X_{A/D} - \text{offset}) \cdot S \quad \text{Equation 1}$$

$$V_x = \int G_x dt = \int (X_{A/D} - \text{offset}) \cdot S dt = V_{TM}, \quad \text{Equation 2}$$

where, $X_{A/D}$ is an output of the sensor, offset is the zero offset, S is a scale factor, and $V_{TM}$ is the vehicle speed measured by the speedometer mounted at the transmission. The scale factor S is predetermined according to a specific accelerometer.

Therefore, the zero offset of a forward acceleration is calculated as, $$\text{offset} = \text{Mean}\left(\frac{\int_0^T X_{A/D} dt - (V_{TM}(T) - V_{TM}(0)) \cdot \frac{1}{S}}{T}\right) \quad \text{Equation 3}$$

$$= \text{Mean}\left(\frac{\sum_1^N X_{A/D} \cdot T_S - (V_{TM}(T) - V_{TM}(0)) \cdot \frac{1}{S}}{T_S \cdot N}\right),$$

where N in the second line of the above equation is a predetermined sufficiently large integer to calculate numerical integration of the first line, and $T_s = T/N$.

The zero offset of a forward acceleration calculated as in the equation 3 is used to correct the error of the forward acceleration $G_x$ in the equation 1.

A third step 32, being performed after the second step 31 is finished, corrects the error in the lateral acceleration and a way to correct the error in the lateral acceleration will be hereinafter described.

There is a relation between the lateral acceleration $G_y$ measured at the acceleration sensor, the vehicle speed V, and the steering angle δ, such as, $$G_y = (Y_{A/D} - \text{offset}) \cdot S = \frac{V^2}{1+AV^2} \cdot \frac{\delta}{L}, \quad \text{Equation 4}$$

where, $Y_{A/D}$ is an output of the sensor, offset is the zero offset, S is a scale factor, A is a stability factor, and L is the wheelbase of the car. The scale factor S is predetermined according to a specific accelerometer, and the wheelbase L depends on the car.

Therefore, the zero offset of a lateral acceleration is calculated as, $$\text{offset} = \text{Mean}\left(Y_{A/D} - \frac{V^2}{1+AV^2} \cdot \frac{\delta}{L} \cdot \frac{1}{S}\right). \quad \text{Equation 5}$$

The zero offset of a lateral acceleration calculated as in the equation 5 is used to correct the error of the forward acceleration $G_y$ in the equation 4.

A forth step 33, being performed after the third step 32 is finished, corrects the yaw-rate on the basis of vehicle speed V and steering angle δ, and a way to correct the error in yaw-rate will be hereinafter described.

For a normal turn of a car, there is a relation between the yaw-rate r, the vehicle speed V, and the steer angle δ, such as, $$r = (R_{A/D} - \text{offset}) \cdot S = \frac{V}{1+AV^2} \cdot \frac{\delta}{L}, \quad \text{Equation 6}$$

where, $R_{A/D}$ is an output of the sensor, offset is the zero offset, S is a scale factor, A is a stability factor, and L is the wheelbase of the car. The scale factor S is predetermined according to a specific accelerometer, and the wheelbase L depends on the car.

Accordingly, the zero offset of a yaw-rate is calculated as, $$\text{offset} = \text{Mean}\left(R_{A/D} - \frac{V}{1+AV^2} \cdot \frac{\delta}{L} \cdot \frac{1}{S}\right). \quad \text{Equation 7}$$

The zero offset of a yaw-rate calculated as in the equation 7 is used to correct the error of the yaw-rate r in the equation 6.

A fifth step 34, being performed after the forth step 33 is finished, records the corrected values of acceleration and rotational angular velocity of the car in the storing part 25.

According to the method of the present invention as shown above, the precise value of acceleration and rotational angular velocity can be recorded by correcting zero offset errors of the acceleration sensor and yaw-rate sensor on the basis of vehicle speed measured at the transmission and the steering angle measured by the steering angle sensor. The precise records enable precise reconstruction of an accident.

What is claimed is:

1. A method for minimizing errors in sensors used for a recording apparatus of car accidents, the method comprising the steps of:

measuring data by sensors, the data including acceleration, yaw-rate, vehicle speed, and steering angle;

correcting errors in forward acceleration on the basis of vehicle speed;

correcting errors in lateral acceleration on the basis of vehicle speed and steering angle;

correcting errors in the yaw-rate on the basis of steering angle and vehicle speed; and recording data as corrected values.

2. A method of claim 1 wherein the step of correcting errors in forward acceleration further comprises the step of correcting the forward acceleration $G_x$ from an output $X_{A/D}$ of the acceleration sensor on the basis of the vehicle speed measured at the transmission.

3. A method of claim 2 wherein the forward acceleration $G_x$ is calculated as, $G_x = (X_{A/D} - \text{offset}) \cdot S$, wherein S is a scale factor predetermined according to a specific accelerometer and the offset, the zero offset of the forward acceleration is calculated as, $$\text{offset} = \text{Mean}\left(\frac{\int_0^T X_{A/D} dt - (V_{TM}(T) - V_{TM}(0)) \cdot \frac{1}{S}}{T}\right),$$

where $V_{TM}$ is a vehicle speed measured at the transmission.

4. A method of claim 1 wherein the step of correcting errors in lateral acceleration further comprises the step of correcting the lateral acceleration $G_y$ from an output $Y_{A/D}$ of the acceleration sensor on the basis of the vehicle speed measured at the transmission and the steering angle measured by a steering angle sensor.

5. A method of claim 4 wherein the lateral acceleration $G_y$ is calculated as, $$G_y = (Y_{A/D} - \mathit{offset}) \cdot S = \frac{V^2}{1+AV^2} \cdot \frac{\delta}{L}, \text{ wherein,}$$

S is a scale factor predetermined according to a specific accelerometer,
A is a stability factor,
L is a wheelbase of the car,
V is a vehicle speed measured at the transmission,
δ is a steering angle measured by the steering angle sensor, and the offset, the zero offset of the lateral acceleration, is calculated as, $$\mathit{offset} = \text{Mean}\left(Y_{A/D} - \frac{V^2}{1+AV^2} \cdot \frac{\delta}{L} \cdot \frac{1}{S}\right).$$

6. A method of claim 1 wherein the step of correcting errors in the yaw-rate further comprises the step of correcting the yaw-rate r from an output $R_{A/D}$ of the yaw-rate sensor on the basis of the vehicle speed measured at the transmission and the steering angle measured by a steering angle sensor.

7. A method of claim 6 wherein the yaw-rate is calculated as, $$r = (R_{A/D} - \mathit{offset}) \cdot S = \frac{V}{1+AV^2} \cdot \frac{\delta}{L}, \text{ wherein,}$$

S is a scale factor predetermined according to a specific accelerometer,
A is a stability factor,
L is a wheelbase of the car,
V is a vehicle speed measured at the transmission,
δ is a steering angle measured by the steering angle sensor, and
the offset, the zero offset of the yaw-rate, is calculated as, $$\mathit{offset} = \text{Mean}\left(R_{A/D} - \frac{V}{1+AV^2} \cdot \frac{\delta}{L} \cdot \frac{1}{S}\right).$$

* * * * *